US008095884B2

(12) United States Patent
Karunakaran et al.

(10) Patent No.: US 8,095,884 B2
(45) Date of Patent: Jan. 10, 2012

(54) AUTOMATIC ALIGNMENT WITH SUBCOMPONENTS ON A VISUAL LAYOUT

(75) Inventors: Rajeev V. Karunakaran, Redmond, WA (US); Brian L. Welcker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 11/756,665

(22) Filed: Jun. 1, 2007

(65) Prior Publication Data

US 2008/0301547 A1 Dec. 4, 2008

(51) Int. Cl.
*G06F 17/00* (2006.01)
(52) U.S. Cl. .................... 715/768; 715/764; 345/662
(58) Field of Classification Search .......... 715/788, 715/243–247, 252–253, 798–802
See application file for complete search history.

(56) References Cited

U.S. PATENT DOCUMENTS

| | | | |
|---|---|---|---|
| 4,575,813 A | 3/1986 | Bartlett et al. | |
| 4,974,174 A | 11/1990 | Kleinman | |
| 5,425,138 A | 6/1995 | Kumakawa | |
| 5,588,099 A * | 12/1996 | Mogilevsky et al. | 715/273 |
| 5,796,401 A | 8/1998 | Winer | |
| 6,144,974 A | 11/2000 | Gartland | |
| 6,686,935 B1 | 2/2004 | Richard | |
| 6,738,079 B1 | 5/2004 | Kellerman et al. | |
| 7,093,196 B1 * | 8/2006 | Griffiths et al. | 715/246 |
| 7,146,562 B2 | 12/2006 | Janssen | |
| 7,177,045 B2 | 2/2007 | Goel et al. | |
| 2003/0025737 A1 * | 2/2003 | Breinberg | 345/801 |
| 2004/0066407 A1 * | 4/2004 | Regan et al. | 345/764 |
| 2004/0194028 A1 * | 9/2004 | O'Brien | 715/517 |
| 2004/0205624 A1 | 10/2004 | Lui et al. | |
| 2004/0261012 A1 * | 12/2004 | Balsiger | 715/508 |
| 2006/0161836 A1 | 7/2006 | Thomson et al. | |
| 2007/0244783 A1 * | 10/2007 | Wright et al. | 705/35 |

OTHER PUBLICATIONS

International Searching Authority, "Written Opinion of the International Searching Authority", PCT/US2008/065310, 5 pages, see pp. 3-5, mailed Oct. 27, 2008, Korean Intellectual Property Office, Daejeon, Republic of Korea.
International Searching Authority, "International Search Report", PCT/US2008/065310, 3 pages, see p. 2, mailed Oct. 27, 2008, Korean Intellectual Property Office, Daejeon, Republic of Korea.
Mittelbach, "Formatting documents with floats a new algorithm for LATEX2", Proceedings of the Annual Meeting, TUG boat, vol. 21, No. 3, May 19, 2000, pp. 278-290.
Hu, et al, "Table Structure Recognition and Its Evaluation", Dec. 2000, pp. 12.

* cited by examiner

*Primary Examiner* — Quoc A Tran
(74) *Attorney, Agent, or Firm* — Capitol City TechLaw; Richard C. Irving

(57) ABSTRACT

A processing device may include a WYSIWYG tool for designing two-dimensional visual layouts. The processing device may display a visual layout including a first object component and a second object component. The first object component, or an object subcomponent thereof, may be moved or resized, or an object subcomponent of the second object component may be moved or resized. When an edge of the first object component or an edge of the object subcomponent, thereof, is within a snapping distance of an edge of the object subcomponent of the second object component, the processing device may attempt to align the edges and may display an indicator indicating alignment of the edges. The first object component or the object subcomponent, thereof, may be drawn to an aligned position with the object subcomponent of the second object component while the aligned edges are within the snapping distance.

20 Claims, 5 Drawing Sheets

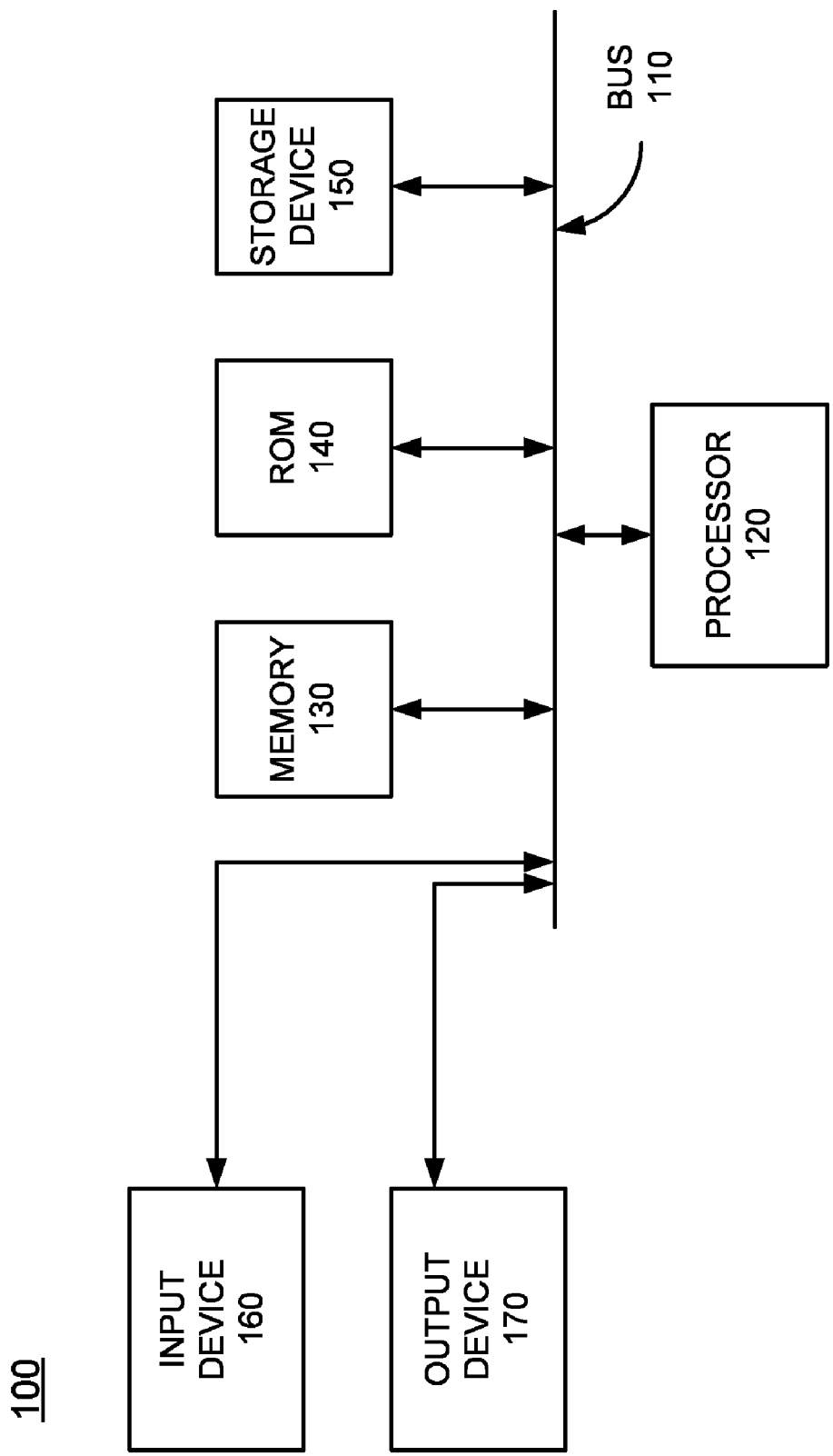

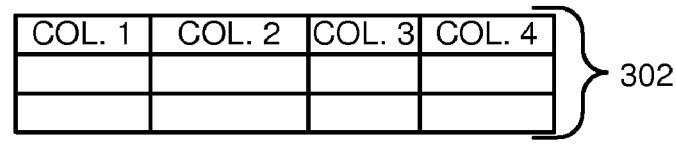
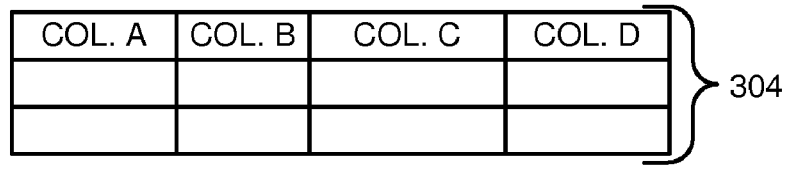
*FIG. 3A*
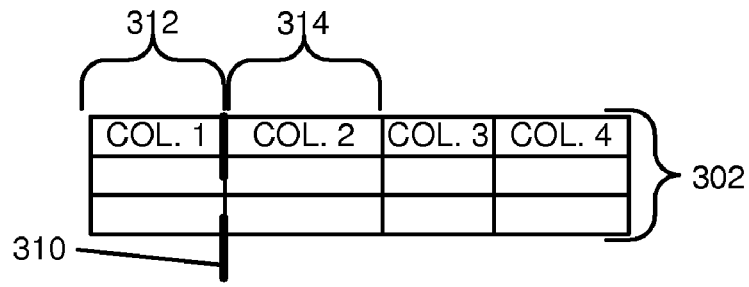
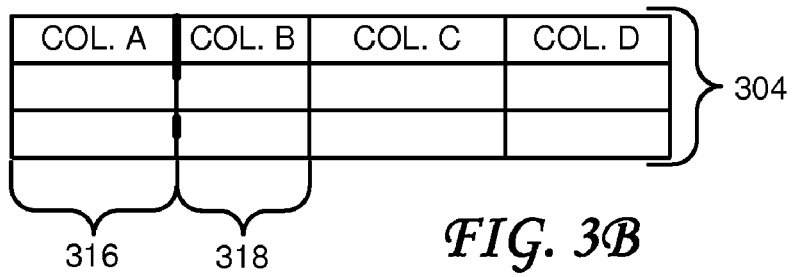
*FIG. 3B*
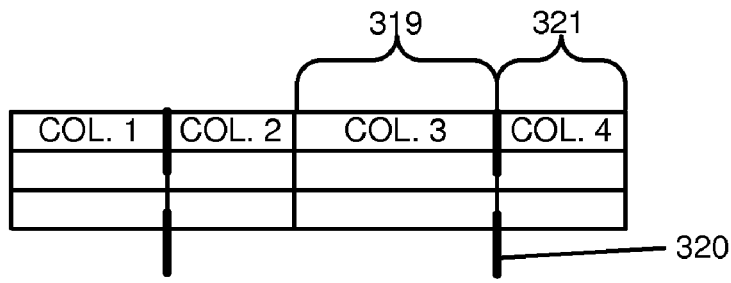
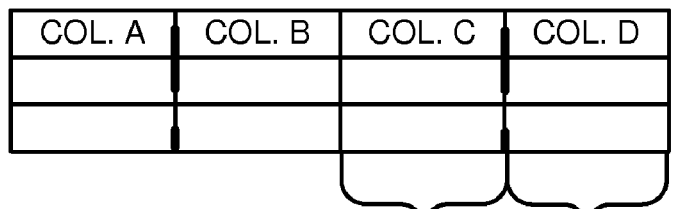
*FIG. 3C*

AUTOMATIC ALIGNMENT WITH SUBCOMPONENTS ON A VISUAL LAYOUT

BACKGROUND

What-you-see-is-what-you-get (WYSIWYG) tools may be used by a designer to design two-dimensional visual layouts in a variety of domains including, but not limited to, user interfaces, diagramming, and reports. The productivity of the designer may be affected by usability factors of a WYSIWYG tool.

An object component of a visual layout is an object which can exist independently. Examples of object components may include, but not be limited to, tables, bar charts, and text boxes. Existing WYSIWYG tools may automatically align or "snap" edges of object components with edges of other object components. Thus, for example, when a designer repositions or resizes a text box with respect to a table and a left edge of the textbox is within a predetermined distance of a left edge of the table, the left edge of the textbox may automatically align or "snap" to the left edge of the table.

An object child component is a component nested within an object component. Object child components are independent of the object components in which they are nested. For example, an object child component may have meaning outside of a context of an object component in which it is nested. An example of an object child component may include, but not be limited to, a textbox included within an object component, such as, for example, a rectangle. When a designer repositions or resizes an object child component and an edge of the object child component is within a predetermined distance of an edge of an object component or a second object child component, the edge of the object child component may automatically align or "snap" to the edge of the object component or the second object child component.

An object subcomponent is a dependent object included within an object component. An object subcomponent may be meaningless outside of a context of an object component. An object component may include one or more object subcomponents. Examples of object subcomponents may include, but are not limited to, rows or columns within a table, bars within a bar chart, and legends within a chart or graph. When a designer repositions or resizes an item, such as, for example, an object component or an object subcomponent, if the designer wishes to align an edge of the item with an edge of an object subcomponent, the designer may manually align the edges. However, manual alignment may be awkward or impossible in some situations.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a processing device, which may include a WYSIWYG tool for designing two-dimensional visual layouts, may be provided. A two-dimensional visual layout may be displayed on a display screen of the processing device. The two-dimensional visual layout may include a first object component and a second object component. A user may move or resize the first object component, or an object subcomponent thereof, or the user may resize an object subcomponent of the second object component. As a result of the moving or the resizing, an edge of the first object component or an edge of the object subcomponent of the first object component may come within a snapping distance of an edge of the object subcomponent of the second object component. The edges may be within the snapping distance when a horizontal distance or a vertical distance between the edges is less than a predetermined distance.

When the edge of the first object component or the edge of the object subcomponent of the first object component is within the snapping distance of the edge of the object subcomponent of the second object component, the processing device may attempt to align the edges. In one embodiment, the processing device may display an indicator indicating alignment of the edges. The indicator may be a visual indicator, such as, for example, a dashed line, or other visual indicator displayed on the aligned edges. In some embodiments, a resistance may be provided, such that, the first object component, or the object subcomponent of the first object component, may resist movement from an aligned position with the object subcomponent of the second object component while the aligned edges are within the snapping distance.

In some embodiments, the processing device may detect a user action for suppressing automatic alignment of an edge of a first object component or an object subcomponent thereof, with an edge of an object subcomponent of a second object component. The user action may include pressing of a hardware button, selection of a soft button, changing of a configuration option, or another user action. When the processing device detects the user action, automatic alignment of edges included in a two-dimensional visual layout may be suppressed.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 is a functional block diagram of a processing device which may implement embodiments consistent with the subject matter of this disclosure.

FIGS. 3A-3D illustrate examples in which one or more edges of object subcomponents of a first object component may be aligned with one or more edges of object subcomponents of a second object component.

DETAILED DESCRIPTION

Figure 2A:
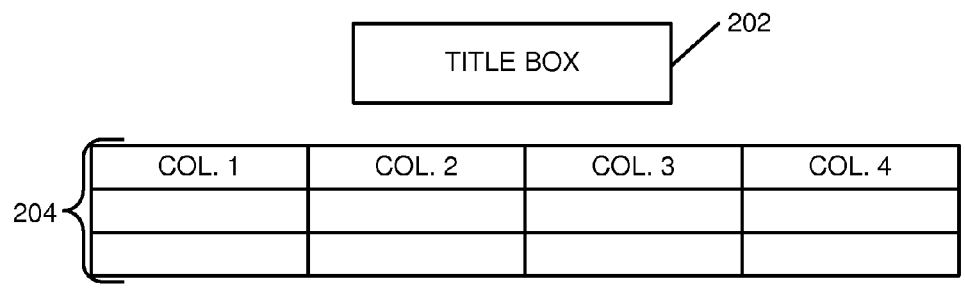
FIGS. 2A-2C illustrate examples in which one or more edges of a first object component may be aligned with one or more edges of an object subcomponent of a second object component.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a processing device is provided. The processing device may include a WYSIWYG tool for designing two-dimensional visual layouts including, but not limited to, dialogs, forms, diagrams, charts, and tables.

In one embodiment consistent with the subject matter of this disclosure, a processing device executing a WYSIWYG tool may display a two-dimensional visual layout. The two-dimensional visual layout may include one or more object components. A designer or user may move or resize an item, such as, for example, a first object component or an object subcomponent thereof, with respect to an object subcomponent of a second object component. As a result of the moving or the resizing of the item or the object subcomponent, an edge of the item may come within a snapping distance of an edge of the object subcomponent. In some embodiments, an edge of an item may be within a snapping distance of an edge of an object subcomponent when a horizontal distance or a vertical distance between the edges is less than a predetermined distance. In one embodiment, an edge of an item is within a snapping distance of an edge of an object subcomponent when a horizontal distance between the edges is less than a first predetermined distance or when a vertical distance between the edges is less than a second predetermined distance.

When the edges are within the snapping distance, the processing device may attempt to automatically align the edges. For example, the processing device may provide an alignment indicator to indicate alignment of the edges. In some embodiments, the alignment indicator may be a visual indicator, such as, for example, a dashed line, or other visual indicator, overlaid onto the automatically aligned edges. Further, in some embodiments, the processing device may cause resistance with respect to further repositioning or resizing of the edge of the item or the edge of the object subcomponent when the edges are within the snapping distance. As an example of resistance, in an embodiment in which the user uses a pointing device to move or resize an object component or an object subcomponent, movement of a pointer associated with the pointing device may cause movement or resizing of the object component or the object subcomponent by an amount proportionate to an amount of movement of the pointer. However, when an edge of an object component or object subcomponent is within a snapping distance of an edge of an object subcomponent of a second object component, the edges may be automatically aligned and the pointer for moving or resizing the object component or the object subcomponent may move the edges outside of the snapping distance only by moving or resizing one of the object component or the object subcomponent, such that the edges that were within the snapping distance are no longer within the snapping distance.

In some embodiments, a user may suppress automatic alignment of an edge of an item with an edge of an object subcomponent. For example, the user of the processing device may perform an action. Upon detecting the action, the processing device may suppress the automatic alignment of edges of the item with edges of the object subcomponent. The action may include pressing of a hardware button, such as, for example, a key on a keyboard, or other hardware button of the processing device, selecting a soft button from a display of the processing device, changing a configuration option via a configuration display of the processing device, or another action.

Exemplary Processing Device

FIG. 1 is a functional block diagram that illustrates an exemplary processing device 100, which may be used to implement embodiments consistent with the subject matter of this disclosure. Processing device 100 may include a bus 110, a processor 120, a memory 130, a read only memory (ROM) 140, a storage device 150, an input device 160, and an output device 170. Bus 110 may permit communication among components of processing device 100. Processing device 100 may be a desktop personal computer (PC), a notebook PC, a handheld processing device, a tablet PC, or other type of processing device.

Processor 120 may include at least one conventional processor or microprocessor that interprets and executes instructions. Memory 130 may be a random access memory (RAM), a Flash memory, or another type of dynamic storage device that stores information and instructions for execution by processing device 120. Memory 130 may also store temporary variables or other intermediate information used during execution of instructions by processing device 120. ROM 140 may include a conventional ROM device or another type of static storage device that stores static information and instructions for processing device 120. Storage device 150 may include any type of media for storing data and/or instructions.

Input device 160 may include one or more conventional mechanisms that permit a user to input information to processing device 100, such as, for example, a keyboard, a mouse, a touch screen, or other input device. Output device 170 may include one or more conventional mechanisms that output information to the user, including one or more displays, or other output devices.

Processing device 100 may perform such functions in response to processing device 120 executing sequences of instructions contained in a tangible machine-readable medium, such as, for example, memory 130, or other medium. Such instructions may be read into memory 130 from another machine-readable medium, such as storage device 150, or from a separate device via a communication interface (not shown).

Exemplary Displays

FIG. 2A illustrates an exemplary processing device display of a visual layout including a title box 202, which may be an object component, and a table 204, which may be an object component including rows and columns, which may be object subcomponents of table 204. In the exemplary display of FIG. 2A, edges of title box 202 are not within a snapping distance of the edges of the object subcomponents of table 204.

Figure 2B:
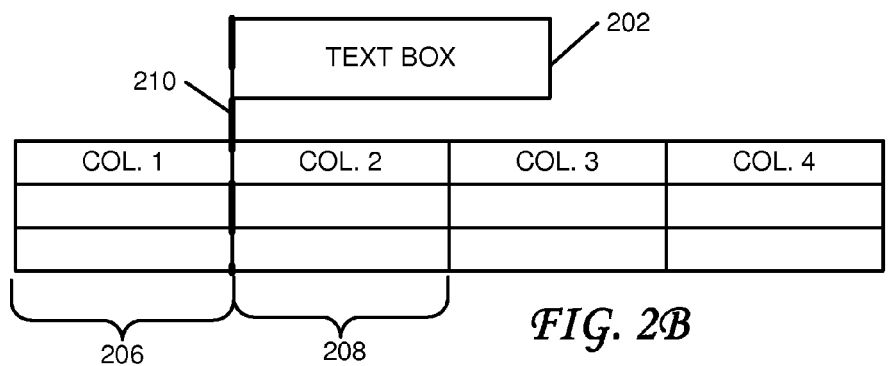

FIG. 2B illustrates the exemplary displayed visual layout of FIG. 2A after a user moved textbox 202. In this example textbox 202 has been moved left. The user may move textbox 202 by selecting and dragging textbox 202 with a pointing device, such as a computer mouse, or via other methods. As a left edge of textbox 202 moves into a position, which is within a snapping distance (in this example, a predetermined horizontal distance) of a right edge of column 1 object subcomponents 206 and a left edge of column 2 object subcomponents 208, textbox 202 may be drawn into an alignment position with respect to the right edge of column 1 object subcomponents 206 and the left edge of column 2 object subcomponents 208. Further, an indicator, such as, for example, a visual indicator, may be provided to inform the user of the aligned edges. In one embodiment, the visual indicator may be a dashed line, such as a dashed line 210 overlaid onto a right edge of column 1 object subcomponents 206 and the left edge of column 2 object subcomponents 208. In some embodiments, a resistance may be provided, such that, for example, aligned edges may tend to remain aligned unless movement or resizing of an object component or an object subcomponent causes the aligned edges to be outside of the snapping distance with respect to each other.

Figure 2C:
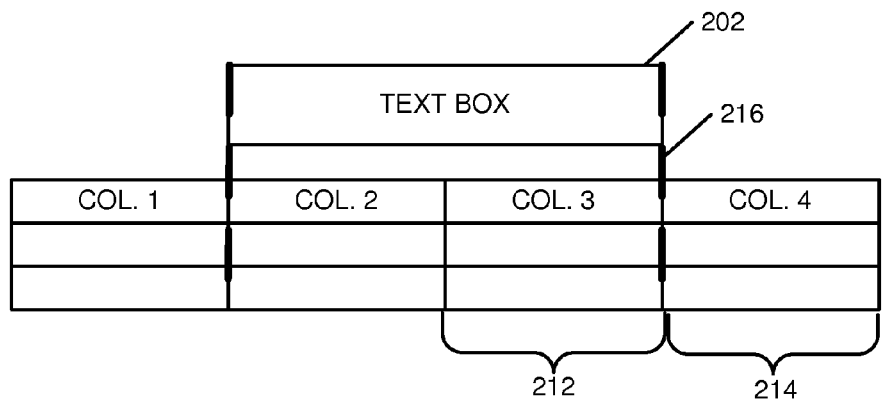

FIG. 2C illustrates the exemplary displayed visual layout of FIG. 2B after the user resizes text box 202. In some embodiments, the user may resize text box 202 by selecting and dragging an edge of textbox 202, or via other methods. In this example, as a right edge of textbox 202 moves into a position, which is within a snapping distance of a right edge of column 3 object subcomponents 212 and a left edge of column 4 object subcomponents 214, textbox 202 may be drawn into an alignment position with respect to the right edge of column 3 object subcomponents 212 and the left edge of column 4 object subcomponents 214. As mentioned above, an indicator, such as, for example, a visual indicator, may be provided to inform the user of the aligned edges. The visual indicator may be a dashed line such as, for example, dashed line 216 overlaid onto the right edge of column 3 object subcomponents 212 and the left edge of column for object subcomponents 214.

FIG. 3A illustrates an exemplary displayed visual layout including two object components (in this example, tables) 302, 304, each of which may include object subcomponents (in this example, rows and columns). In the exemplary display of FIG. 3A, no object subcomponent edges or object component edges of object component 302 are within snapping distance of object subcomponent edges or object component edges of object component 304.

FIG. 3B illustrates the exemplary display of FIG. 3A after a user moved object component 302 left. The user may move object component 302 by selecting and dragging object component 302 with a pointing device, or via other methods. As a right edge of column 1 subcomponents 312 (which is a left edge of column 2 subcomponents) of object component 302 moves into a position, which is within a snapping distance (in this example, a predetermined horizontal distance) of a right edge of a column A subcomponents 316 (which is a left edge of column B subcomponents 318) of object component 304, object component 302 may be drawn into an alignment position with respect to the right edge of column 1 subcomponents 312 (and the left edge of column 2 subcomponents 314) with the right edge of column A subcomponents 316 (and the left edge of column B subcomponents 318). Further, an indicator, such as, a visual indicator, may be provided to inform the user of the aligned edges. As mentioned previously, the visual indicator may be a dashed line, such as a dashed line 310 overlaid onto the right edge of column 1 object subcomponents 312 (and the left edge of column 2 object subcomponents 314) and the right edge of column A subcomponents 316 (and the left edge of column B object subcomponents 318).

FIG. 3C illustrates the exemplary displayed visual layout of FIG. 3B after the user resizes column 3 subcomponents 319. In one embodiment, the user may resize column 3 subcomponents 319 by using a pointing device and selecting and dragging a side edge of column 3 subcomponents 319. In other embodiments, other methods may be used to resize subcomponents. As a right edge of column 3 subcomponents 319 (which is a left edge of column 4 subcomponents 321) of object component 302 moves into a position, which is within a snapping distance (in this example, a predetermined horizontal distance) of a right edge of column C subcomponents 322 (which is a left edge of column D subcomponents 324) of object component 304, object component 302 may be drawn into an alignment position with respect to the right edge of column 3 subcomponents 319 (and the left edge of column 4 subcomponents 321) with the right edge of column C subcomponents 322 (and the left edge of the column D subcomponents 324). Further, an indicator, such as, a visual indicator, may be provided to inform the user of the aligned edges. As mentioned previously, the visual indicator may be a dashed line, such as dashed line 320 overlaid onto a right edge of column 3 object subcomponents 319 (and the left edge of column 4 object subcomponents 321.)

Figure 3D:
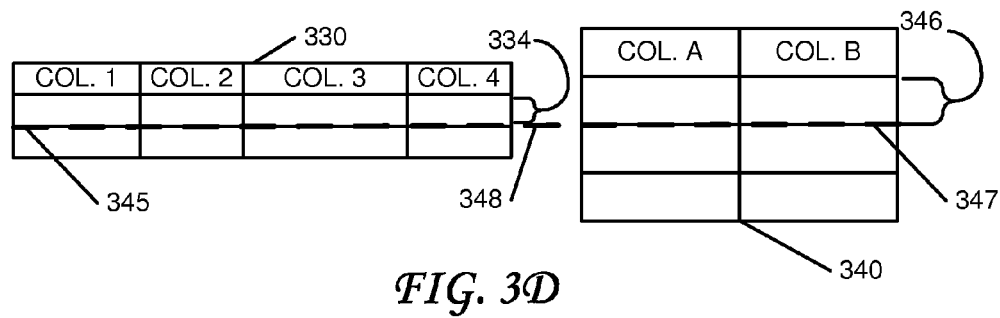

FIG. 3D illustrates an exemplary visual layout showing an object component 330 left of an object component 340. Object components 330, 340 may include row and column subcomponents. Movement or resizing of either object component 330 or object component 340, such that an edge of a subcomponent of object component 330 or an edge of object component 330 is within a snapping distance of an edge of an object subcomponent of object component 340 may cause the edges within the snapping distance to be drawn into an alignment position. In this example, the snapping distance may be a predetermined vertical distance. FIG. 3D shows an edge 345 of rows subcomponents 334 of object component 330 being aligned with an edge 347 of row subcomponents 346 of object component 340. An indicator, such as, for example, a dashed line 348 may be overlaid onto the aligned edges to inform the user of alignment of the edges.

Figure 4:
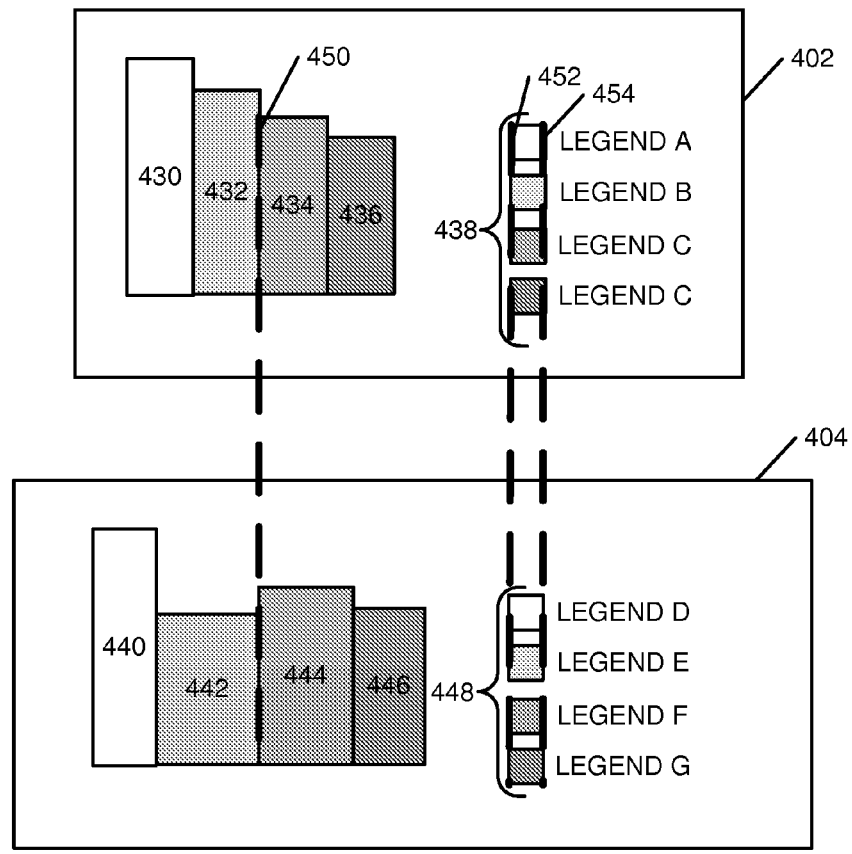
FIG. 4 shows an example in which one or more edges of object subcomponents of bar chart components may be aligned.

FIG. 4 illustrates an example of a visual layout in which two bar charts may be aligned. In the exemplary visual layout, a bar chart (object component) 402 may be positioned above a bar chart (object component) 404. Bar chart 402 may include a number of subcomponents, such as, for example, bars 430, 432, 434, 436 and legends 438. Bar chart 404 may include a number of subcomponents, such as, for example, bars 440, 442, 444, 446 and legends 448. When movement or resizing of object components or object subcomponents causes an edge of an object subcomponent of a first object component to be within a snapping distance of an edge of an object subcomponent of a second object component, the edges may be drawn into an alignment position, as shown in FIG. 4 (see edges between bars 442 and 444 of bar chart 404 with respect to edges between bars 432 and 434 for bar chart 402, as well as edges of legends 438 and 448). In this example, the snapping distance may be a predetermined horizontal distance. An indicator, such as, for example, a dashed line may be overlaid onto the aligned edges to inform the user of alignment of the edges. In the exemplary visual layout of FIG. 4, dashed lines 450, 452, 454 are visual indicators for informing the user of alignment of the edges.

Exemplary Processing

Figure 5:
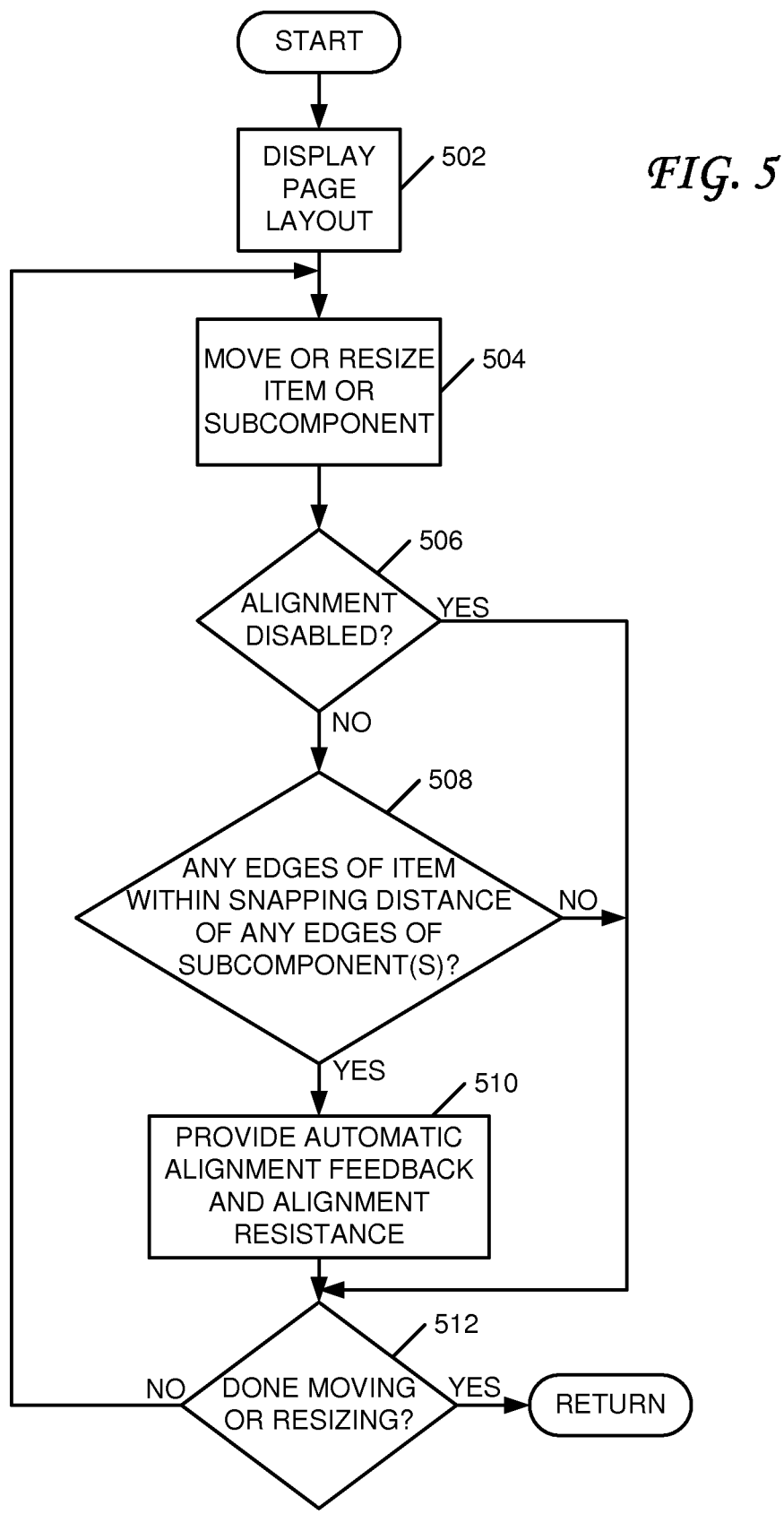
FIG. 5 is a flowchart illustrating an exemplary process which may be performed in embodiments consistent with the subject matter of this disclosure.

FIG. 5 is a flowchart illustrating an exemplary process which may be performed by a processing device, such as, for example, processing device 100, in embodiments consistent with the subject matter of this disclosure. The process may begin with the processing device displaying a visual layout (act 502). The visual layout may include a first object component and a second object component. The second object component may include one or more object subcomponents.

Next, the user may move or resize an item, which, in this example, may be a first object component or an object subcomponent of the first object component, or the user may move or resize and object subcomponent of the second object component (act 504). In one embodiment, the user may move an object component or an object subcomponent by using a pointing device and selecting and dragging the object component or the object subcomponent. The user may resize an object component or an object subcomponent by selecting an edge of the object component or the object subcomponent and dragging the edge, thereby changing a size of the object component or the object subcomponent. In other embodiments, other methods may be used to move or resize an object component or an object subcomponent.

The processing device may then determine whether automatic alignment is disabled (act 506). The user may perform an action to disable the automatic alignment. In one embodiment, the user may press or select a button to toggle the automatic alignment on or off. The button may be a hardware button, such as, for example, a key press or a sequence of key presses of keys on a keyboard, or other keys. In some embodiments, the button may be a soft button on a display of the processing device, which the user may select by touching the soft button, by selecting the soft button with a pointing device, or by using another method to select the soft button.

If the processing device determines that alignment is not disabled, then as an object component or subcomponent is moved or resized, the processing device may determine whether any edges of the item are within snapping distance of any edges of one or more object subcomponents of the second object component (act 508). Edges may be within snapping distance when the edges are within a predetermined horizontal distance or are within a predetermined vertical distance. In some embodiments, the predetermined horizontal distance and the predetermined vertical distance may be different. In other embodiments, the predetermined horizontal distance and the predetermined vertical distance may be the same.

If the processing device determines that at least some of the edges of the item are within the snapping distance of at least some of the edges of one or more object subcomponents of the second object component, then the processing device may provide automatic alignment feedback and alignment resistance (act 510). The automatic alignment feedback may include visual feedback. For example, in some embodiments, a dashed line may be overlaid onto aligned edges, as explained previously. In other embodiments, the processing device may provide other types of automatic alignment feedback. As explained previously, one or more edges of an item within a snapping distance of one or more edges of an object subcomponent of an object component, different from the object component of the item, may be drawn into alignment, or automatically aligned, when the user stops moving or resizing the item or the object subcomponent. When the one or more edges of the item and the one or more edges of the object subcomponent are no longer within the snapping distance of one another, the edges may not be drawn into alignment, or automatically aligned, when the user stops moving or resizing the item or the object subcomponent.

Next, the processing device may determine whether the user is done moving or resizing the item or the object subcomponent (act 512). In some embodiments, the user may move or resize the item or the object subcomponent by pressing and holding a button of a pointing device, such as, for example, a computer mouse or other pointing device, and moving or resizing the item or the object subcomponent with a pointer associated with the pointing device. In such embodiments, the processing device may determine that the user is done moving or resizing the item or the object subcomponent when the button of the pointing device is released. In other embodiments, the processing device may determine that the user is done moving or resizing the item or the object subcomponent via other methods, including, but not limited to, the user performing a user action, such as, a user action to close a WYSIWYG tool on the processing device, or a different user action. If the processing device determines that the moving or resizing is completed, then the process may be completed. Otherwise, acts 504-512 may be repeated.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A machine-implemented method for automatic object subcomponent alignment on a display of a processing device, the machine-implemented method comprising:

displaying a page layout including a first object component and a second object component separate from the first object component, the first object component and the second object component being capable of existing independently, the second object component having at least one object subcomponent included therein and dependent upon the second object component;

performing one of moving or resizing the first object component on the page layout;

attempting to automatically align an edge of the first object component with an edge of one of the at least one object subcomponent when the edge of the first object component is within a snapping distance of the edge of the one of the at least one object subcomponent as a result of the performing one of moving or resizing the first object component on the page layout; and providing a visual indicator over the edge of the first object component and over the edge of the one of the at least one object subcomponent such that the visual indicator forms a single line over the edge of the first object component and extending over the edge of the one of the at least one object subcomponent, the visual indicator indicating alignment of the edge of the first object component with the edge of the one of the at least one object subcomponent.

2. The machine-implemented method of claim 1, wherein the first object component is a text box.

3. The machine-implemented method of claim 1, wherein the at least one object subcomponent includes at least one column of a table or at least one row of the table.

4. The machine-implemented method of claim 1, wherein attempting to automatically align an edge of the first object component with an edge of one of the at least one object subcomponent when the edge of the first object component is within a snapping distance of the edge of the one of the at least one object subcomponent further comprises:

providing a resistance with respect to moving the edge of the first object component within the snapping distance of the edge of the at least one object subcomponent.

5. The machine-implemented method of claim 1, further comprising:
suppressing automatic alignment of the edge of the first object component with the edge of the at least one object subcomponent upon detecting an action by a user.

6. The machine-implemented method of claim 1, wherein the at least one object subcomponent includes a bar of a bar chart.

7. The machine-implemented method of claim 1, wherein the single line is a dashed line.

8. A processing device comprising:
at least one processor; and
a memory connected to the at least one processor, the memory comprising:
instructions for displaying a page layout including a first object component, having a plurality of first object subcomponents included therein and dependent upon the first object component, and a second object component having a plurality of second object subcomponents included therein and dependent upon the second object component, the first object component and the second object component being capable of existing independently and being separate from each other,
instructions for moving or resizing one of the plurality of first object subcomponents in response to a user action,
instructions for automatically aligning an edge of the one of the plurality of first object subcomponents with an edge of one of the plurality of second object subcomponents when the edge of the one of the plurality of first object subcomponents is within a snapping distance of the edge of the one of the plurality of second object subcomponents as a result of moving or resizing the one of the plurality of first object subcomponents; and
instructions for providing a visual indicator over the edge of the one of the plurality of first object subcomponents and over the edge of the one of the plurality of second object subcomponents such that the visual indicator forms a single line over the edge of the one of the plurality of first object subcomponents and extending over the edge of the one of the plurality of second object subcomponents, the visual indicator indicating alignment of the edge of the one of the plurality of first object subcomponents with the edge of the one of the plurality of second object subcomponents.

9. The processing device of claim 8, wherein the instructions for automatically aligning an edge of the one of the plurality of first object subcomponents with an edge of one of the plurality of second object subcomponents when the edge of the one of the plurality of first object subcomponents is within a snapping distance of the edge of the one of the plurality of second object subcomponents further comprise:
instructions for providing a resistance with respect to moving the edge of the one of the plurality of first object subcomponents within the snapping distance of the edge of the one of the plurality of second object subcomponents.

10. The processing device of claim 8, wherein:
the plurality of first object subcomponents are rows or columns of a first table and the plurality of second object subcomponents are rows or columns of a second table.

11. The processing device of claim 8, wherein:
the plurality of first object subcomponents are bars of a first bar chart and the plurality of second object subcomponents are bars of a second bar chart.

12. The processing device of claim 8, wherein an edge of the one of the plurality of first object subcomponents is within a snapping distance of an edge of the one of the plurality of second object subcomponents when the edge of the one of the plurality of first object subcomponents is within a predetermined horizontal distance of the edge of the one of the plurality of second object subcomponents or when the edge of the one of the plurality of first object subcomponents is within a predetermined vertical distance of the edge of the one of the plurality of second object subcomponents.

13. The processing device of claim 8, wherein the memory further comprises:
instructions for suppressing an automatic alignment of an edge of the one of the plurality of first object subcomponents with an edge of one of the plurality of second object subcomponents after detecting a second user action.

14. The processing device of claim 8, wherein the single line is a dashed line.

15. A machine-readable medium having instructions recorded thereon for at least one processor, the machine-readable medium comprising:
instructions for displaying a page layout including a first item and a second object component separate from the first item, the second object component being capable of existing independently and including at least one object subcomponent dependent thereon;
instructions for changing a distance of an edge of the first item with respect to an edge of one of the at least one object subcomponent of the second object component in response to a user action;
instructions for automatically aligning the edge of the first item with the edge of the one of the at least one object subcomponent of the second object component when the edge of the first item is within a snapping distance of the edge of the one of the at least one object subcomponent of the second object component, the first item being either a first object component or an object subcomponent of the first object component, the first object component being capable of existing independently and including therein the object subcomponent of the first object component, the object subcomponent of the first object subcomponent being dependent on the first object component; and
instructions for providing a visual indicator over the edge of the first item and over the edge of the one of the at least one object subcomponent of the second object component such that the visual indicator forms a single line over the edge of the first item and extending over the edge of the one of the at least one object subcomponent of the second object component, the visual indicator indicating alignment of the edge of the first item with the edge of the one of the at least one object subcomponent of the second object component, wherein
the machine-readable medium is to be included in a storage device.

16. The machine-readable medium of claim 15, further comprising:
instructions for determining whether the edge of the first item is within the snapping distance of the edge of the one of the at least one object subcomponent of the second object component, the instructions for determining whether the edge of the first item is within the snapping distance of the edge of the one of the at least one object subcomponent of the second object component further comprise:
instructions for determining whether the edge of the first item is within a predetermined horizontal distance or a predetermined vertical distance of the edge of the one of the at least one object subcomponent of the second object component.

17. The machine-readable medium of claim 15, further comprising:
   instructions for providing feedback when the edge of the first item is within a snapping distance of the edge of the one of the at least one object subcomponent of the second object component.

18. The machine-readable medium of claim 15, further comprising:
   instructions for providing a resistance with respect to changing a distance of the edge of the first item from the edge of the one of the least one object subcomponent of the second object component when the edge of the first item is within the snapping distance of the edge of the one of the at least one object subcomponent of the second object component.

19. The machine-readable medium of claim 15, further comprising:
   instructions for suppressing automatic alignment of the edge of the first item with the edge of the one of the at least one object subcomponent of the second object component in response to a second user action.

20. The tangible machine-readable medium of claim 15, wherein the first item is a legend of a first chart and the one of the at least one object subcomponent of the second object component is a legend of a second chart.

* * * * *